(12) United States Patent
V

(10) Patent No.: US 12,393,455 B2
(45) Date of Patent: Aug. 19, 2025

(54) AUTOMATED QUALITY OF SERVICE MANAGEMENT MECHANISM

(71) Applicant: NetApp, Inc., Sunnyvale, CA (US)

(72) Inventor: Prajwal V, Karnataka (IN)

(73) Assignee: NetApp, Inc., San Jose, CA (US)

( * ) Notice: Subject to any disclaimer, the term of this patent is extended or adjusted under 35 U.S.C. 154(b) by 435 days.

(21) Appl. No.: 17/219,808

(22) Filed: Mar. 31, 2021

(65) Prior Publication Data

US 2022/0326992 A1   Oct. 13, 2022

(51) Int. Cl.
| | |
|---|---|
| G06F 9/50 | (2006.01) |
| G06F 3/06 | (2006.01) |
| G06F 9/46 | (2006.01) |
| G06F 11/30 | (2006.01) |
| G06F 11/34 | (2006.01) |
| G06F 13/20 | (2006.01) |

(52) U.S. Cl.
CPC ............ G06F 9/5005 (2013.01); G06F 9/466 (2013.01); G06F 13/20 (2013.01)

(58) Field of Classification Search
CPC ......... G06F 9/5005; G06F 9/466; G06F 13/20
USPC .................. 710/15, 18, 29, 34, 60, 105, 107
See application file for complete search history.

(56) References Cited

U.S. PATENT DOCUMENTS

| | | | | |
|---|---|---|---|---|
| 2013/0227111 | A1* | 8/2013 | Wright | G06F 11/3495 709/223 |
| 2013/0227145 | A1* | 8/2013 | Wright | H04L 67/1008 709/226 |
| 2017/0251058 | A1* | 8/2017 | Zachariassen | H04L 49/901 |
| 2018/0081832 | A1* | 3/2018 | Longo | H04L 67/10 |
| 2021/0124497 | A1* | 4/2021 | Bert | G06F 3/0679 |
| 2021/0286641 | A1* | 9/2021 | Matsuda | H04L 43/0888 |
| 2022/0043602 | A1* | 2/2022 | Deneui | G06F 3/0659 |

\* cited by examiner

*Primary Examiner* — Tim T Vo
*Assistant Examiner* — Henry W Yu
(74) *Attorney, Agent, or Firm* — Jaffery Watson Hamilton & DeSanctis LLP

(57) ABSTRACT

A system is described. The system includes a processing resource and a non-transitory computer-readable medium, coupled to the processing resource, having stored therein instructions that when executed by the processing resource cause the processing resource to collect telemetry data of a distributed storage system associated with a client device, monitor a first set of the IOPS values, select a first IOPS value in the first set of the IOPS values as a highest IOPS value, determine whether the first IOPS value is unequal to a current Max-IOPS parameter value and adjust the Max-IOPS parameter value to be equal to the first IOPS value upon a determination that the first IOPS value is unequal to the current Max-IOPS parameter value.

20 Claims, 11 Drawing Sheets

| Min | Actual | Max | Burst | Credit |
|---|---|---|---|---|
| 50 | 50 | 100 | 150 | 0 |
| 50 | 70 | 100 | 150 | 50 |
| 50 | 100 | 100 | 150 | 80 |
| 50 | 130 | 100 | 150 | 80 |
| 50 | 150 | 100 | 150 | 50 |
| 50 | 100 | 100 | 150 | 0 |
| 50 | 100 | 100 | 150 | 0 |
| 50 | 90 | 100 | 150 | 0 |
| 50 | 110 | 100 | 150 | 10 |
| 50 | 100 | 100 | 150 | 0 |
| 50 | 90 | 100 | 150 | 0 |
| 50 | 80 | 100 | 150 | 10 |
| 50 | 130 | 100 | 150 | 30 |
| 50 | 100 | 100 | 150 | 0 |
| 50 | 90 | 100 | 150 | 0 |
| 50 | 110 | 100 | 150 | 10 |

*FIG. 4A*

| Min | Actual | Max | Burst | Credit |
|---|---|---|---|---|
| 50 | 50 | 100 | 150 | 0 |
| 50 | 70 | 100 | 150 | 50 |
| 50 | 100 | 100 | 150 | 80 |
| 50 | 130 | 100 | 150 | 80 |
| 50 | 150 | 130 | 150 | 50 |
| 50 | 100 | 150 | 150 | 30 |
| 50 | 100 | 150 | 150 | 80 |
| 50 | 90 | 150 | 150 | 130 |
| 50 | 110 | 150 | 150 | 190 |
| 50 | 100 | 110 | 150 | 230 |
| 50 | 90 | 110 | 150 | 240 |
| 50 | 80 | 110 | 150 | 260 |
| 50 | 130 | 110 | 150 | 290 |
| 50 | 100 | 130 | 150 | 270 |
| 50 | 90 | 130 | 150 | 300 |
| 50 | 110 | 130 | 150 | 340 |

*FIG. 4B*

AUTOMATED QUALITY OF SERVICE MANAGEMENT MECHANISM

BACKGROUND

In data storage architectures, a client's data may be stored in a volume. The client can access the client data from the volume via one or more volume servers coupled to the volume. The volume servers can map the locations of the data specified by the client, such as file name, drive name, etc., into unique identifiers that are specific to the location of the client's data on the volume. Using the volume server as an interface to the volume allows the freedom to distribute the data evenly over the one or more volumes. The even distribution of data can be beneficial in terms of volume and system performance.

Read and write requests of the client are typically transformed into read and/or write input-output operations (IOPS). For example, a file read request by a client can be transformed into one or more read IOPS of some size. Similarly, a file write request by the client can be transformed into one or more write IOPS.

BRIEF DESCRIPTION OF THE DRAWINGS

In the following drawings like reference numbers are used to refer to like elements. Although the following figures depict various examples, one or more implementations are not limited to the examples depicted in the figures.

FIGS. 4A&4B illustrate embodiments of input-output operations tables.

DETAILED DESCRIPTION

IOPS is a standard way of measuring the performance of a storage system by providing an indication as to a quantity of requests (e.g., read and write request operations) that are made per second. To estimate IOPS required by a workload on a volume, storage administrators measure the IOPS over a time interval and selects the highest value measured during the time interval. A storage system experiences a sluggish performance in instances in which insufficient IOPS are provided to a workload. Conversely, the storage system will have unused capacity if the provisioned IOPS are higher than what the workload actually needs.

Storage Quality of Service (QoS) policies define the IOPS associated with a volume and ensures that they are met. Thus, QoS parameters are variables that that define desired QoS bounds may for a client using the storage system. QoS policies also provide consistent performance to workloads, and are using the following parameters: Min-IOPS; Max-IOPS; and Burst-IOPS. Min-IOPS is defined as a minimum quantity of IOPS that will be provided by a policy (e.g., QoS reservation). Max-IOPS is defined as a maximum quantity IOPS that will be limited by a policy (e.g., QoS limit). Burst-IOPS is defined as a quantity of IOPS available for a temporary period based on unused IOPS (e.g., burst credit).

Figure 1:
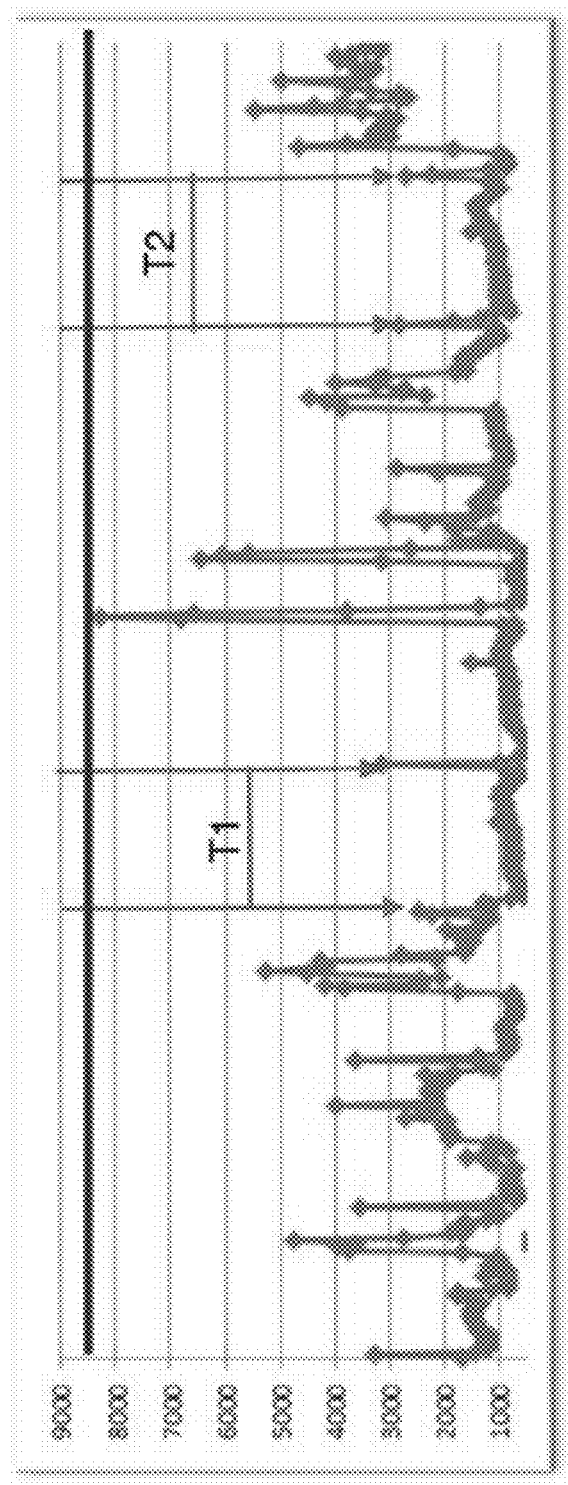
FIG. 1 is a graph illustrating one embodiment of an input-output operations estimation.

Estimation of the IOPS and setting accurate QOS parameters is a challenge to many storage administrators, and often leads to poor performance of storage workloads if not appropriately provisioned, monitored and configured. FIG. 1 is a graph illustrating one embodiment of an IOPS estimation. As shown in FIG. 1, the IOPS have been estimated over a period of time and observed to go as high as 8500. Thus, MAX IOPS has been set to 8500. Additionally, there are many time intervals (T1, T2 etc.) in which the IOPS reserved in QOS policy is not utilized. If the timeline in FIG. 1 is extrapolated to hours or days, an overprovisioning problem occurs since the utilized IOPS is far below the provisioned. In order to mitigate this overprovisioning IOPS usage typically needs to be monitored and altered accordingly, which is currently performed manually by an administrator.

According to one embodiment, a QoS management mechanism is provided to automatically monitor IOPS and alter QoS parameters. In such an embodiment, the management mechanism analyzes past workload consumption and sets new QoS parameters based on the IOPS measurements performed during the analysis. In a further embodiment, a plurality of QoS tiers are provided to account for increasing demand in instances in which higher QoS parameters need to be continuously increased. In this embodiment, each of the plurality of tiers (e.g., bronze, silver, gold, etc.) is associated with an IOPS threshold (or limit) (e.g., tier limit). In yet a further embodiment, the management mechanism may dynamically adjust QoS to a tier based on the IOPS measurements.

In one embodiment, the management mechanism may perform a provisioning process in which a client selects an initial QoS tier (e.g., bronze) associated with a first tier limit (e.g., 5000 IOPS), and analyzes IOPS measurement data from client workloads prior to provisioning the QoS parameters based on the analysis. For example, upon a determination during workload analysis that the initial demand is less than the selected tier limit (e.g., 2000 IOPS), the Max IOPS QoS parameter is set to 2000 IOPS, rather than 5000 IOPS.

As discussed above, the management mechanism continuously monitors the system and automatically adjusts the IOPS parameters accordingly. In such an embodiment, the management mechanism may automatically adjust the Max IOPS QoS parameter based on the IOPS monitoring. In a further embodiment, the management mechanism may transmit a message to the client upon a determination that the client demand has reached the tier limit. As a result, the message transmitted by the management mechanism may recommend that the client upgrade to next tier (e.g., silver) associated with a second limit (e.g., 7500 IOPS).

As used herein, a storage workload is defined as any operation (e.g., data replication, deduplication, data compression etc.) that requires I/O data. Telemetry data may be defined as performance, configuration and other system data of a monitored system. Telemetry data may refer to one data point or a range of data points. Non-limiting examples of telemetry data for a distributed storage system include latency, utilization, a number of IOPS, Quality of Service (QoS) settings, or any other performance related information.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 2:
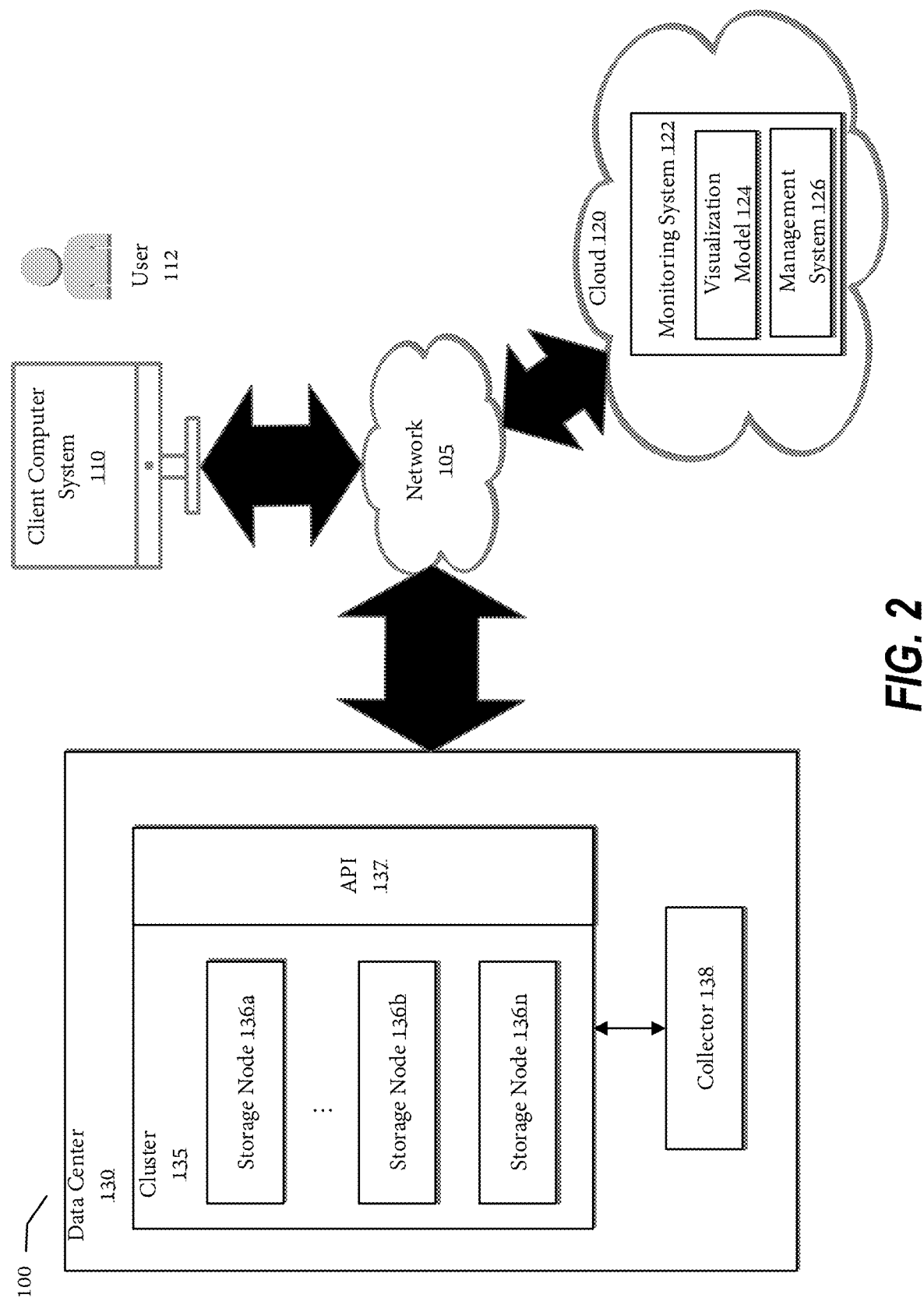
FIG. 2 is a block diagram illustrating an environment in which various embodiments may be implemented.

FIG. 2 is a block diagram illustrating an environment 100 in which various embodiments may be implemented. In various examples described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on a client computer system (or client) 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a client computer system 110, and a user 112. The data center 130, the cloud 120, and the client computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a collector 138. Those of ordinary skill in the art will appreciate additional IT infrastructure would typically be part of the data center 130; however, discussion of such additional IT infrastructure is unnecessary to the understanding of the various embodiments described herein.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 3.

The API 137 may provide an interface through which the cluster 135 is configured and/or queried by external actors (e.g., the collector 138, the client computer system 110, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In various examples described herein, the collector 138 is implemented locally within the same data center in which the cluster 135 resides and periodically polls for telemetry data of the cluster 135 via the API 137. Depending upon the particular implementation, the polling may be performed at a predetermined or configurable interval (e.g., X milliseconds or Y seconds). The collector 138 may locally process and/or aggregate the collected telemetry data over a period of time by data point values and/or by ranges of data point values and provide frequency information regarding the aggregated telemetry data retrieved from the cluster 135 to the centralized monitoring system.

In the context of the present example, the cloud 120, which may represent a private or public cloud accessible (e.g., via a web portal) to an administrator associated with a managed service provide and/or administrators of one or more customers of the managed service provider, includes a cloud-based, centralized monitoring system (e.g., monitoring system 122). The monitoring system 122 may periodically receive monitored information, including raw and/or processed telemetry data (e.g., frequency distributions representing aggregated telemetry data over time) of multiple clusters (e.g., cluster 135) from multiple distributed collectors (e.g., collector 138) operable within respective data centers (e.g., data center 130) of one or more customers of the managed service provider. Depending upon the particular implementation, the monitored information may be pushed from the collector 138 or pulled from the collector 138 in accordance with a monitoring schedule or responsive to an event (e.g., a request issued by user 112 to the monitoring system 122).

As noted above, the monitored information may represent hundreds of thousands of observations (samples) of telemetry data over a period of time in which the vast majority of telemetry data may represent normal operating conditions, but a small number of occurrences (e.g., telemetry data exceeding certain thresholds) may be indicative of events of significance (e.g., an abnormal condition, imminent need for increased storage capacity, imminent failure of a storage node 136, or the like).

In one embodiment, the monitoring system 122 includes a visualization model 124 to facilitate visualization of the monitored information. Depending upon the particular implementation, some aspects of the visualization model (e.g., determination and/or configuration of tuning parameters) may be performed and/or applied by the monitoring system 122 and other aspects of the visualization model may be performed and/or applied by the client computer system 110, for example, by a web browser running on the client computer system 110 performing dynamic code execution of code (e.g., JavaScript) delivered to the browser and embedded within a web page (e.g., a Hypertext Markup Language (HTML) file) by or on behalf of the monitoring system 122.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Figure 3:
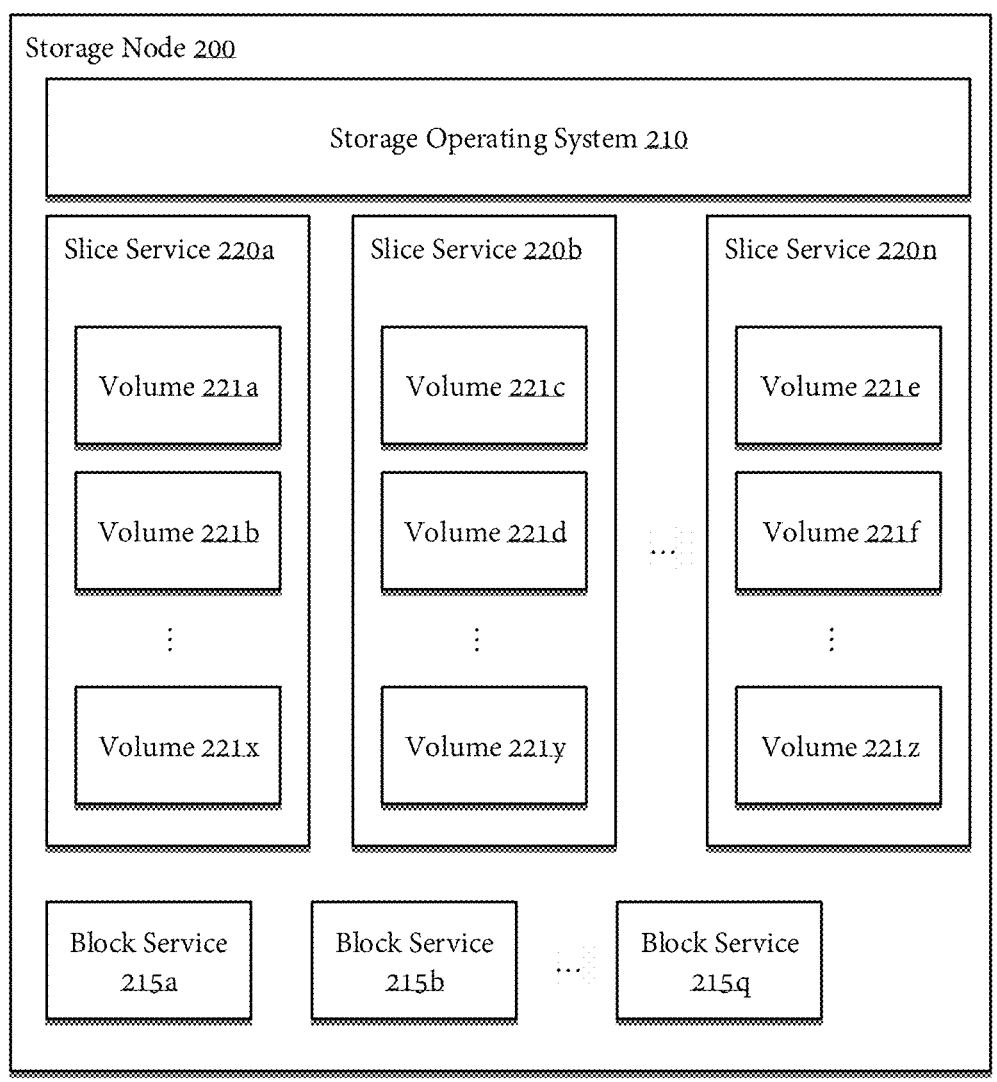
FIG. 3 is a block diagram illustrating a storage node in accordance with an embodiment of the present disclosure.

FIG. 3 is a block diagram illustrating a storage node 200 in accordance with an embodiment of the present disclosure. Storage node 200 represents a non-limiting example of storage nodes 136*a-n*. In the context of the present example, storage node 200 includes a storage operating system 210, one or more slice services 220*a-n*, and one or more block services 215*a-q*. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

Each slice service 220 may include one or more volumes (e.g., volumes 221*a-x*, volumes 221*c-y*, and volumes 221*e-z*). Client systems (not shown) associated with an enterprise may store data to one or more volumes, retrieve data from one or more volumes, and/or modify data stored on one or more volumes.

The slice services 220*a-n* and/or the client system may break data into data blocks. Block services 215*a-q* and slice services 220*a-n* may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220*a-n* may store metadata that maps between client systems and block services 215. For example, slice services 220 may map between the client addressing used by the client systems (e.g., file names, object names, block numbers, etc. such as Logical Block Addresses (LBAs)) and block layer addressing (e.g., block identifiers) used in block services 215. Further, block services 215 may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215*a-q* and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a collector module (e.g., collector 138) may poll an API (e.g., API 137) of a distributed storage system (e.g., cluster 135) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136a-n), individual or groups of volumes 221, individual or groups of slice services 220, and/or individual or groups of block services 215.

Figure 5A:
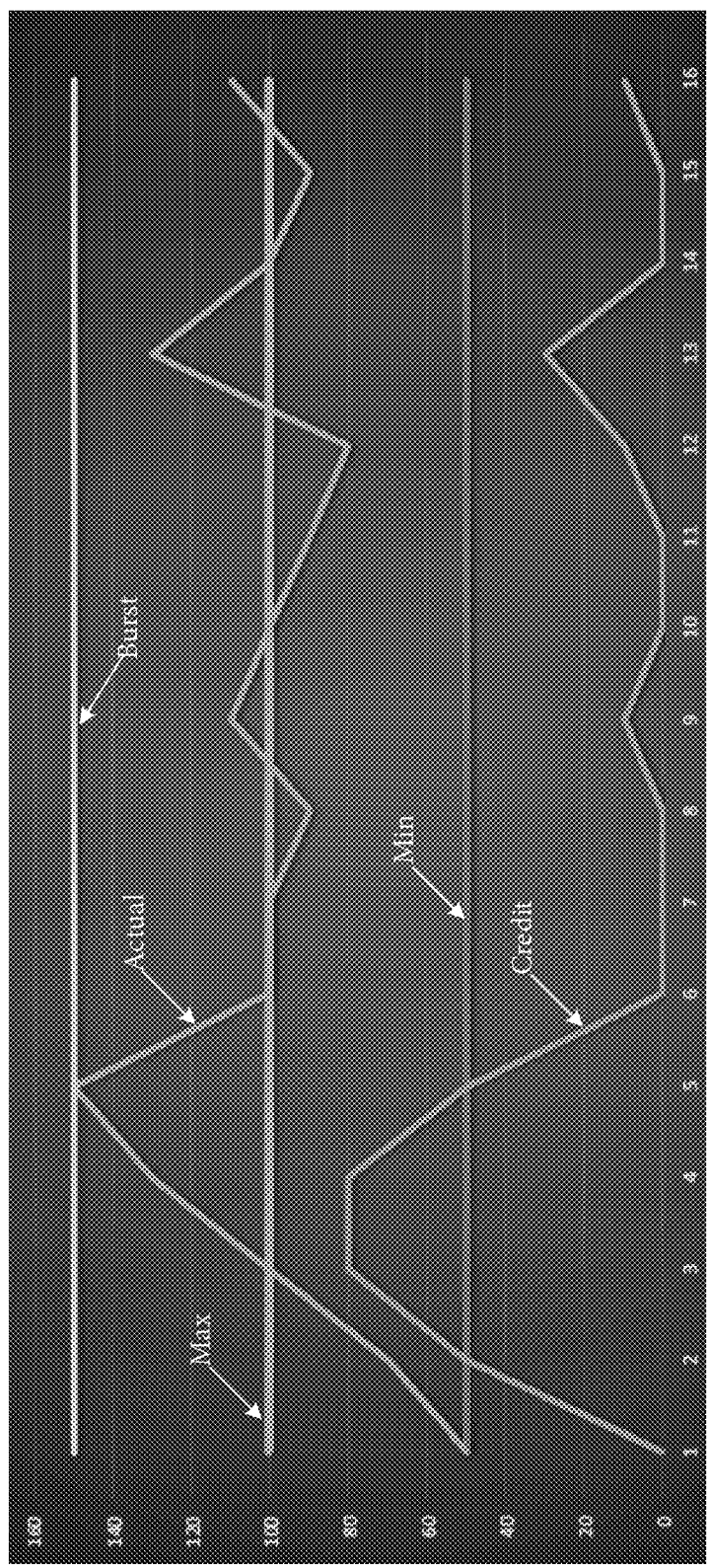
FIGS. 5A&5B are graphs illustrating embodiments of input-output operations utilization.

According to one embodiment, monitoring system 122 includes a management system 126 that is implemented to manage and configure various elements of environment 100. Management system 126 may include one or more computing systems to perform automatic provisioning, monitoring and adjustment of QoS policies for a client. As discussed above, conventional provisioning of Max IOPS QoS parameters are inadequate. For example, FIG. 4A is an IOPS table illustrating results of conventional QoS provisioning. As shown in FIG. 4A, the Min-IOPS; Max-IOPS; and Burst-IOPS parameter values are set as 50, 100 and 150, respectively. As a result, the workload the burst mode is entered too often (e.g., crossing the Max IOPS threshold), which results in degraded performance and depletes the Burst credit quickly. FIG. 5A is a graph illustrating the data shown in FIG. 4A. Thus, in order to enhance the performance, the Max IOPS limit of the QoS policy needs to be adjusted. However, QoS policy must be performed manually in conventional systems.

Figure 6:
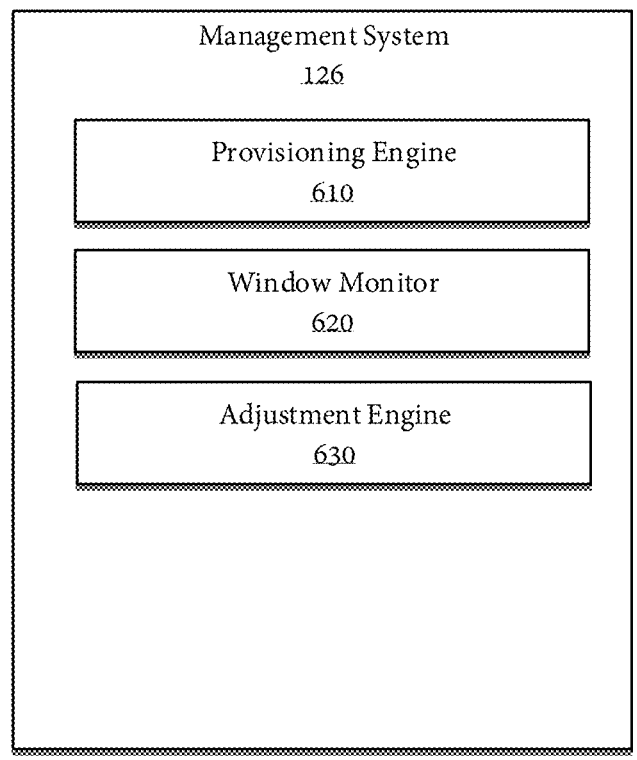
FIG. 6 illustrates one embodiment of a management system.

According to one embodiment, management system 126 monitors and analyzes IOPS data included within telemetry data in order to automatically adjust the Max-IOPS parameter value to reduce burst mode conditions. FIG. 6 illustrates one embodiment of management system 126. As shown in FIG. 6, management system 126 includes provisioning engine 610, window monitor 620 and adjustment engine 630. Provisioning engine 610 provisions QoS parameters for a client 110 in system 110. As discussed above, a user at client 110 may select from among a plurality of QoS tiers (e.g., bronze) and begin executing storage workloads. In such an embodiment, provisioning engine 610 receives a message indicating a selection of a tier, and begins to analyze the IOPS data for a predetermined quantity of time intervals to measure a Max-IOPS provisioning value for the client 110.

Subsequently, provisioning engine 610 determines whether the Max-IOPS parameter value is less than a Max-IOPS limit associated with the selected tier. Provisioning engine 610 sets the Max-IOPS parameter value as the Max-IOPS provisioning value upon a determination that the Max-IOPS provisioning value is less than the Max-IOPS limit associated with the selected tier. However, provisioning engine 610 sets the Max-IOPS parameter value at the selected Max-IOPS limit associated with the selected tier upon a determination that the Max-IOPS provisioning value is greater than or equal to the Max-IOPS limit associated with the selected tier. In such an embodiment, management system may transmit a message to the client 110 recommending that a higher tier (e.g., silver or gold) should be selected.

Figure 7:
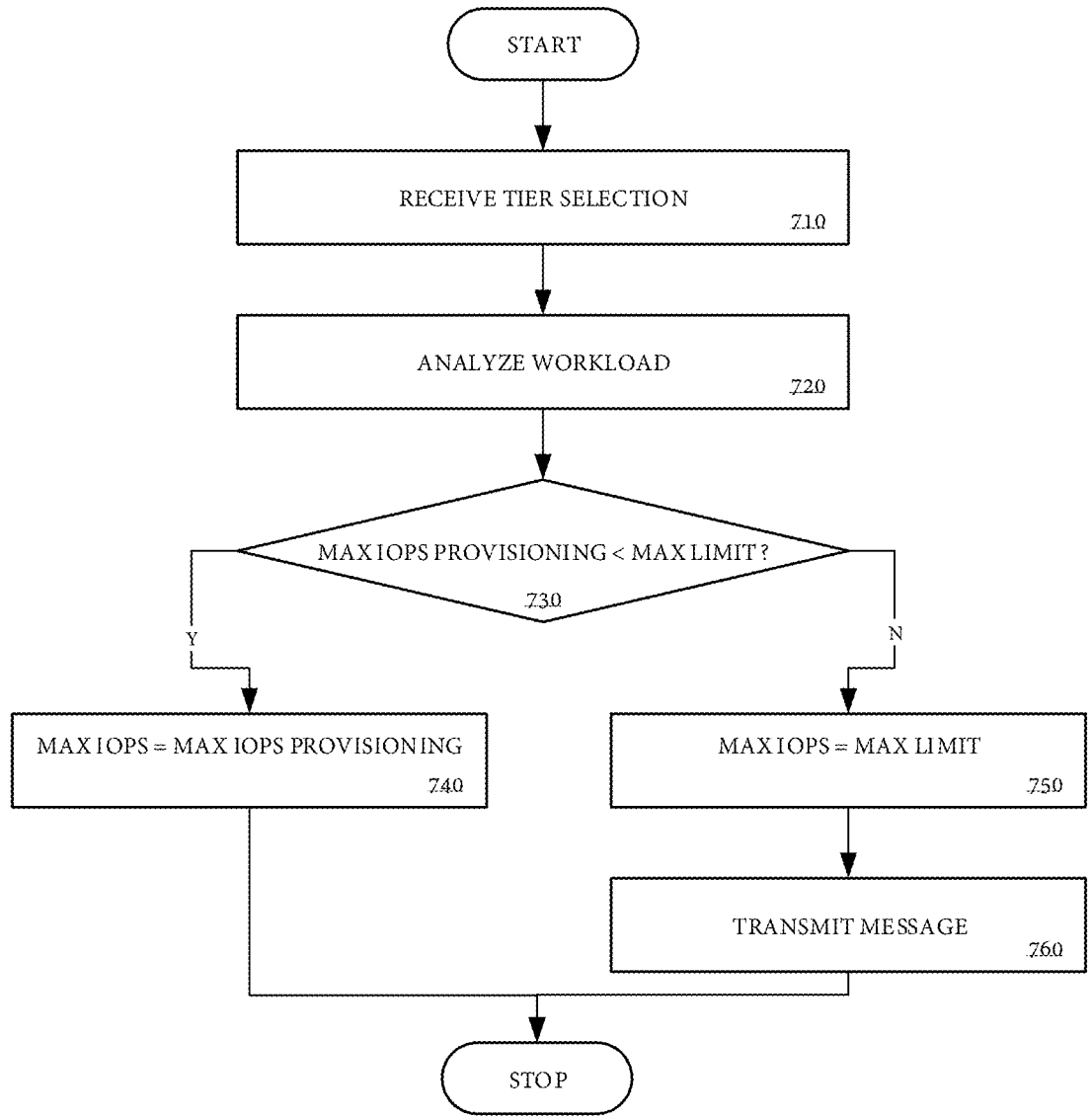
FIG. 7 is a flow diagram illustrating one embodiment of a provisioning process

FIG. 7 is a flow diagram illustrating one embodiment of a provisioning process. At processing block 710, a message including a tier selection is received. At processing block 720, a client 110 workload is analyzed, resulting in a Max-IOPS provisioning value being measured. At decision block 730, a determination is made as to whether the Max-IOPS provisioning value is less than the Max-IOPS limit associated with the selected tier. If so, the Max-IOPS parameter value is set at as an initial Max-IOPS limit associated with the selected tier, processing block 740. Otherwise, the initial Max-IOPS parameter value is set at the Max-IOPS limit associated with the selected tier, processing block 750, and a message is transmitted to the client 110 indicating that a higher tier should be selected.

Referring again to FIG. 6, window monitor 620 begins monitoring telemetry performance data once provisioning is completed to determine the utilization of IOPS (e.g., actual IOPS) by client 110. According to one embodiment, window monitor 620 implements a sliding window process to monitor IOPS data in order to optimize IOPS demand (e.g., spikes or declines). In such an embodiment, window monitor 620 polls actual IOPS at predetermined intervals (e.g., every 'x' number of seconds) to retrieve a series of IOPS data values. In a further embodiment, a window of predefined size (e.g., 'n') is used to monitor a set of the series of values indicated by the window size. For example, a set of four IOPS data values is monitored in an embodiment in which the window size equals n=4.

In one embodiment, window monitor 620 selects the highest IOPS value in the window (or set). Subsequently the process is repeated, with the window sliding down by one value for analysis of the next set of values for the defined window size, which results in the selection of a subsequent highest IOPS value, if applicable. This process is continuously repeated during workload execution. In embodiments, the predetermined interval and window size are selected via visualization model 124 prior to commending the monitoring process.

Figure 5B:
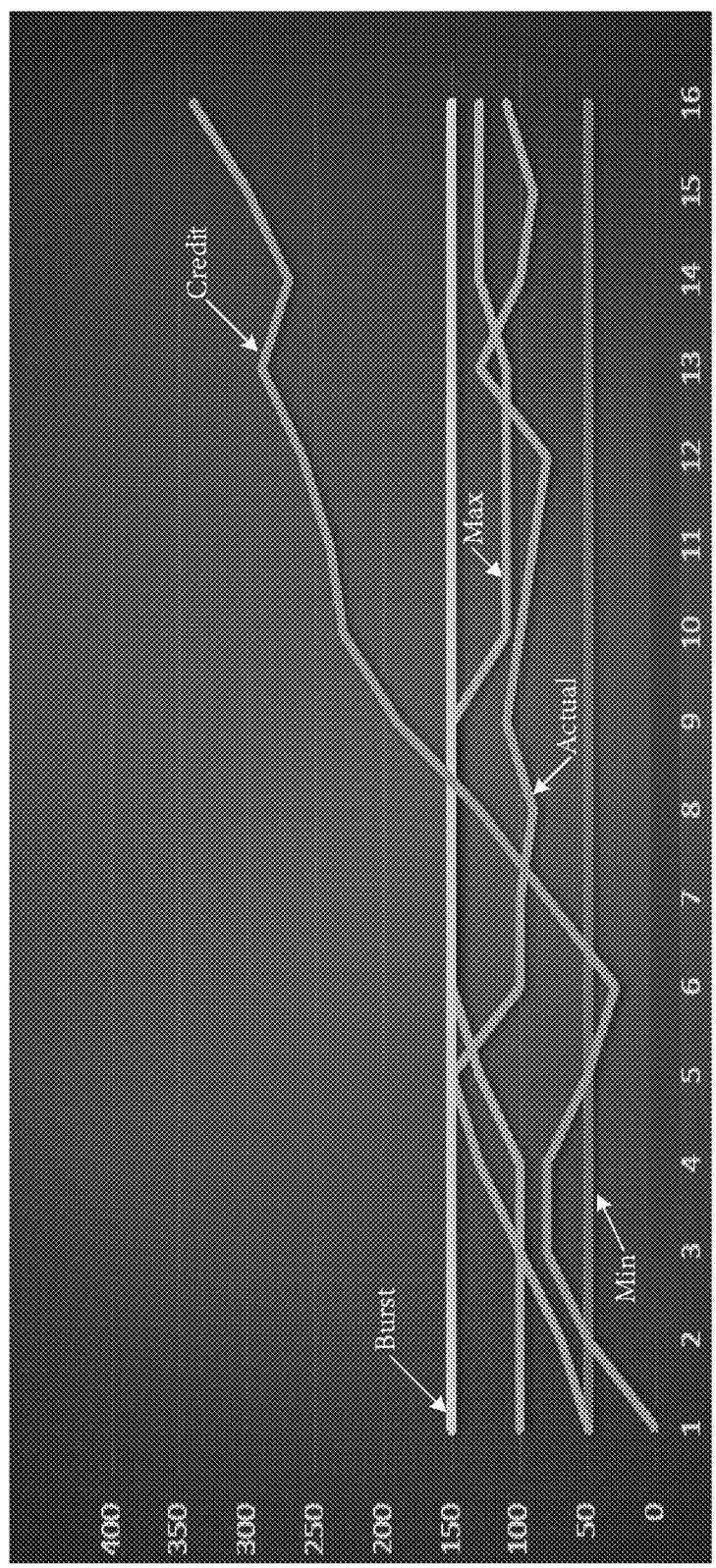

FIG. 4B illustrates one embodiment of an IOPS table implementing the sliding window process. As shown in FIG. 4B, the window size is 4 (e.g., n=4). Thus, the window includes 4 IOPS actual values (e.g., 50, 70, 100, 130), resulting in 130 being selected as the Max-IOPS parameter value. According to one embodiment, adjustment engine 630 automatically adjusts the Max-IOPS parameter value to the window selected value (e.g., the highest IOPS value in the current window) after each window iteration upon a determination that window selected value is different than the current Max-IOPS parameter value (e.g., highest IOPS value Max-IOPS parameter value). For example, the Max-IOPS parameter value is increased from an initial Max-IOPS value of 100 (e.g., set by provisioning engine 610) to the window selected value of 130 after the first window iteration, as shown in FIG. 4B. Similarly, the Max-IOPS parameter value may be decreased upon a determination that the window selected value is less than the Max-IOPS parameter value. FIG. 5B is a graph illustrating the data shown in FIG. 4B.

Figure 8:
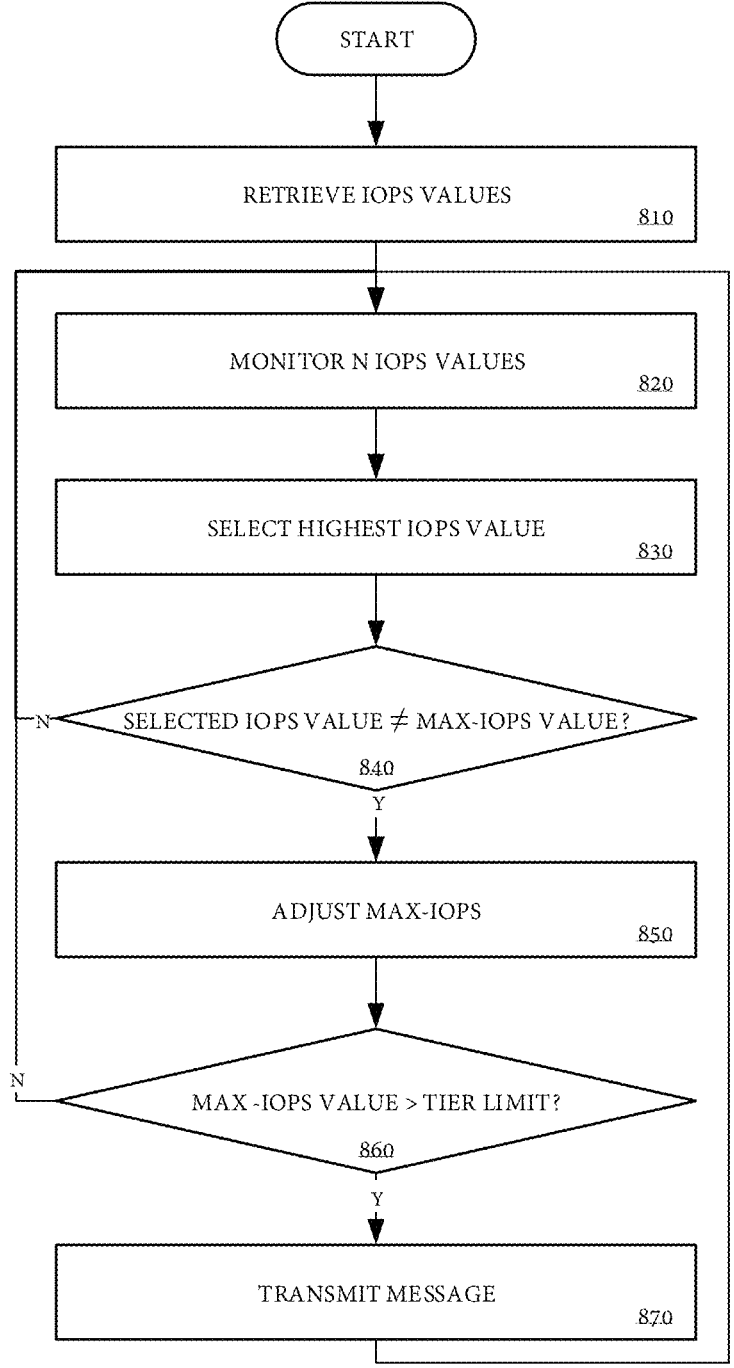
FIG. 8 is a flow diagram illustrating one embodiment of an automatic QoS policy adjustment process.

In a further embodiment, adjustment engine 630 determines whether the increased Max-IOPS parameter value is greater than or equal to the Max-IOPS limit associated with the currently selected tier. As discussed above, management system may transmit a message to the client 110 indicating that a higher tier should be selected. FIG. 8 is a flow diagram illustrating one embodiment of an automatic QoS policy adjustment process. At processing block 810, a series of IOPS data values is retrieved. At processing block 820, apply the window monitor is applied to monitor a set (e.g., first set) of n IOPS data values in the series. At processing block 830, a first IOPS value in the set of n IOPS data values is selected as a highest of the IOPS values. At decision block 840, a determination is made as to whether the selected IOPS value is unequal to a current Max-IOPS value. If not, control is returned to processing block 820, where the monitor window slides one value (e.g., n+1) to cover the next set of n values in the series and the process is repeated. Thus, the next set of four values includes three of the previous values plus one new value.

Upon a determination at decision block 840 that the selected IOPS value is unequal to the current Max-IOPS parameter value, the Max-IOPS value is adjusted to be set as the selected IOPS value (e.g., Max-IOPS parameter value=selected IOPS value), processing block 850. At decision block 860, a determination is made as to whether the new Max-IOPS parameter value is greater than the Max-IOPS value associated with the current tier limit (e.g., in instances in which the Max-IOPS value is increased). If not, control is returned to processing block 820. Otherwise, a message is transmitted to client 110 recommending that the tier limit be increased to the next level, processing block 870. In one embodiment, the provisioning process is repeated upon receiving an indication from the client 110 that the tier limit is to be increased. In an alternative embodiment, a user at client 110 may select a setting to automatically upgrade to a recommended tier. In this embodiment, processing block 870 performs an automatic upgrade to the recommended tier.

The above described mechanism enables the setting of QoS policies without requiring manual allocation, monitoring and tuning of IOPS.

Figure 9:
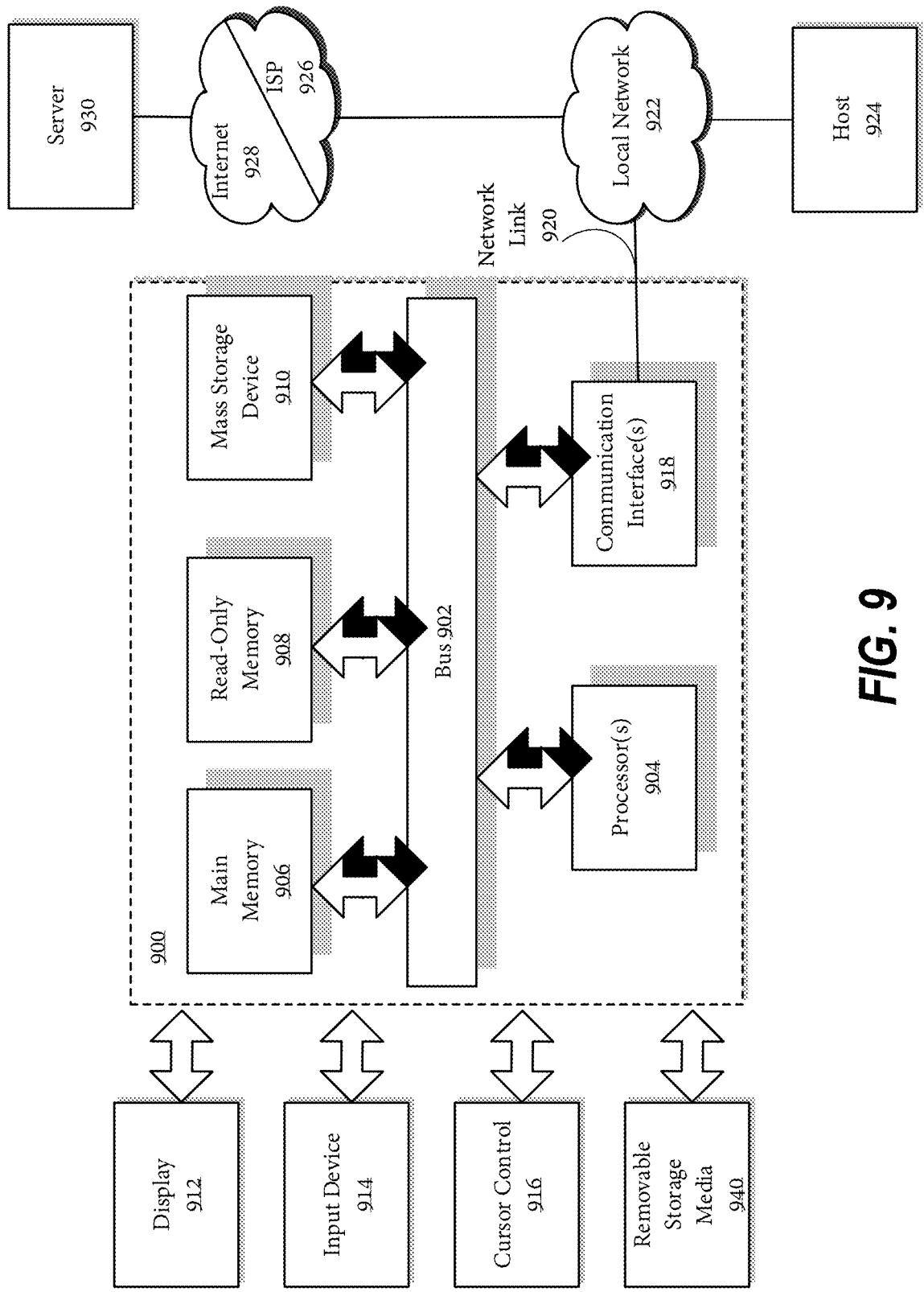
FIG. 9 illustrates an example computer system in which or with which embodiments of the present disclosure may be utilized.

FIG. 9 is a block diagram that illustrates a computer system 900 in which or with which an embodiment of the present disclosure may be implemented. Computer system 900 may be representative of all or a portion of the computing resources associated with a storage node (e.g., storage node 136), a collector (e.g., collector 138), a monitoring system (e.g., monitoring system 122) or an administrative workstation (e.g., client computer system 110). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., a hardware processor 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method performed by one or more processing resources of one or more computer systems, the method comprising:
    collecting telemetry data of a distributed storage system associated with a client device, wherein the telemetry data comprises a plurality of input output operations per second (IOPS) values;
    monitoring a first set of the IOPS values;
    selecting a first IOPS value in the first set of the IOPS values as a highest IOPS value;
    determining whether the first IOPS value is unequal to a current Max-IOPS parameter value;
    adjusting the Max-IOPS parameter value to be equal to the first IOPS value upon a determination that the first IOPS value is unequal to the current Max-IOPS parameter value;
    determining whether the Max-IOPS parameter value is greater than a first Max-IOPS limit associated with a first of a plurality of user selected QoS tiers; and
    transmitting a message to the client device recommending a selection of a second of the plurality of QoS tiers associated with a second Max-IOPS limit.

2. The method of claim 1, further comprising automatically upgrading to the second of the plurality of QoS tiers.

3. The method of claim 1, further comprising:
    monitoring a second set of the IOPS values;
    selecting a highest IOPS value in the second set of the IOPS values;
    determining whether the second IOPS value is equal to a current Max-IOPS parameter; value; and adjusting the Max-IOPS parameter value to be equal to the second IOPS value upon a determination that the second IOPS value is unequal to the current Max-IOPS parameter value.

4. The method of claim 1, further comprising provisioning Qos parameters for the client device.

5. The method of claim 4, wherein provisioning the QoS parameters comprises:
receiving a message from the client device indicating a selection of the first QoS tier;
analyzing IOPS data generated from execution of a workload associated with the client device; and
selecting provisioning Max-IOPS value based on an analysis of the IOPS data.

6. The method of claim 5, wherein provisioning the QoS parameters further comprises:
determining whether the Max-IOPS parameter value is less than the Max-IOPS limit associated with the first tier; and
setting the provisioning Max-IOPS value as the Max-IOPS parameter value upon a determination that the Max-IOPS provisioning value is less than the Max-IOPS limit associated with the first tier.

7. The method of claim 6, wherein provisioning the QoS parameters further comprises transmitting a message to the client device recommending a selection of the second of the plurality of QoS tiers.

8. A non-transitory computer-readable storage medium embodying a set of instructions, which when executed by a processing resource cause the processing resource to:
collect telemetry data of a distributed storage system associated with a client device, wherein the telemetry data comprises a plurality of input output operations per second (IOPS) values;
monitor a first set of the IOPS values;
select a first IOPS value in the first set of the IOPS values as a highest IOPS value;
determine whether the first IOPS value is unequal to a current Max-IOPS parameter value;
adjust the Max-IOPS parameter value to be equal to the first IOPS value upon a determination that the first IOPS value is unequal to the current Max-IOPS parameter value;
determine whether the Max-IOPS parameter value is greater than a first Max-IOPS limit associated with a first of a plurality of user selected QoS tiers; and
transmit a message to the client device recommending a selection of a second of the plurality of QoS tiers associated with a second Max-IOPS limit.

9. The computer-readable storage medium of claim 8, further comprising automatically upgrading to the second of the plurality of QoS tiers.

10. The computer-readable storage medium of claim 8, embodying a set of instructions, which when executed by the processing resource further cause the processing resource to provision QoS parameters for the client device, including:
receiving a message from the client device indicating a selection of the first QoS tier;
analyzing IOPS data generated from execution of a workload associated with the client device; and
selecting provisioning Max-IOPS value based on an analysis of the IOPS data.

11. A system comprising:
a processing resource; and
a non-transitory computer-readable medium, coupled to the processing resource, having stored therein instructions that when executed by the processing resource cause the processing resource to:
collect telemetry data of a distributed storage system associated with a client device, wherein the telemetry data comprises a plurality of input output operations per second (IOPS) values;
monitor a first set of the IOPS values;
select a first IOPS value in the first set of the IOPS values as a highest IOPS value;
determine whether the first IOPS value is unequal to a current Max-IOPS parameter value;
adjust the Max-IOPS parameter value to be equal to the first IOPS value upon a determination that the first IOPS value is unequal to the current Max-IOPS parameter value;
determine whether the Max-IOPS parameter value is greater than a first Max-IOPS limit associated with a first of a plurality of user selected QoS tiers; and
transmit a message to the client device recommending a selection of a second of the plurality of QoS tiers associated with a second Max-IOPS limit.

12. The system of claim 11, further comprising automatically upgrading to the second of the plurality of QoS tiers.

13. The system of claim 11, embodying a set of instructions, which when executed by a processing resource further cause the processing resource to provision QoS parameters for the client device, including:
receiving a message from the client device indicating a selection of the first QoS tier;
analyzing IOPS data generated from execution of a workload associated with the client device; and
selecting provisioning Max-IOPS value based on an analysis of the IOPS data.

14. The computer-readable storage medium of claim 8, embodying a set of instructions, which when executed by the processing resource further cause the processing resource to:
monitor a second set of the IOPS values;
determine whether the second IOPS value is equal to a current Max-IOPS parameter value; and
adjust the Max-IOPS parameter value to be equal to the second IOPS value upon a determination that the second IOPS value is unequal to the current Max-IOPS parameter value.

15. The computer-readable storage medium of claim 14, embodying a set of instructions, which when executed by the processing resource further cause the processing resource to select a highest IOPS value in the second set of the IOPS values.

16. The computer-readable storage medium of claim 10, embodying a set of instructions, which when executed by the processing resource further cause the processing resource to:
wherein provisioning the QoS parameters further comprises:
determining whether the Max-IOPS parameter value is less than the Max-IOPS limit associated with the first tier; and
setting the provisioning Max-IOPS value as the Max-IOPS parameter value upon a determination that the Max-IOPS provisioning value is less than the Max-IOPS limit associated with the first tier.

17. The computer-readable storage medium of claim 16, wherein provisioning the QoS parameters further comprises transmitting a message to the client device recommending a selection of the second of the plurality of QoS tiers.

18. The system of claim 11, embodying a set of instructions, which when executed by the processing resource further cause the processing resource to:

monitor a second set of the IOPS values;
select a highest IOPS value in the second set of the IOPS values;
determine whether the second IOPS value is equal to a current Max-IOPS parameter value; and
adjust the Max-IOPS parameter value to be equal to the second IOPS value upon a determination that the second IOPS value is unequal to the current Max-IOPS parameter value.

19. The system of claim 13, embodying a set of instructions, which when executed by the processing resource further cause the processing resource to:
wherein provisioning the QoS parameters further comprises:
determining whether the Max-IOPS parameter value is less than the Max-IOPS limit associated with the first tier; and
setting the provisioning Max-IOPS value as the Max-IOPS parameter value upon a determination that the Max-IOPS provisioning value is less than the Max-IOPS limit associated with the first tier.

20. The system of claim 19, wherein provisioning the QoS parameters further comprises transmitting a message to the client device recommending a selection of the second of the plurality of QoS tiers.

* * * * *

UNITED STATES PATENT AND TRADEMARK OFFICE
CERTIFICATE OF CORRECTION

| | | |
|---|---|---|
| PATENT NO. | : 12,393,455 B2 | Page 1 of 1 |
| APPLICATION NO. | : 17/219808 | |
| DATED | : August 19, 2025 | |
| INVENTOR(S) | : Prajwal V | |

It is certified that error appears in the above-identified patent and that said Letters Patent is hereby corrected as shown below:

In the Claims

Column 12 Lines 58-59 should be changed from "plurality of QoS tiers associated with a second Max-IOPS limit" to --plurality of QoS tiers.--

Column 13, Line 6 should be changed from "Qos parameters for the client device." to --QoS parameters for the client device.--

Column 13 Lines 49-50 should be changed from "plurality of QoS tiers associated with a second Max-IOPS limit" to --plurality of QoS tiers.--

Column 14 Lines 20-21 should be changed from "plurality of QoS tiers associated with a second Max-IOPS limit" to --plurality of QoS tiers.--

Signed and Sealed this
Sixteenth Day of September, 2025

Coke Morgan Stewart
*Acting Director of the United States Patent and Trademark Office*